United States Patent
Yuan et al.

(10) Patent No.: US 7,512,640 B2
(45) Date of Patent: Mar. 31, 2009

(54) COMMUNICATION METHOD BETWEEN AN ELECTRONIC APPARATUS AND SYNCHRONIZATION SOFTWARE

(75) Inventors: Chia-Shang Yuan, Taichung (TW);
Chi-Yuan Huang, Taipei (TW);
Chih-Hao Hsin, Taipei (TW)

(73) Assignee: Qisda Corporation, Taoyuan County (TW)

( * ) Notice: Subject to any disclaimer, the term of this patent is extended or adjusted under 35 U.S.C. 154(b) by 314 days.

(21) Appl. No.: 11/397,174

(22) Filed: Apr. 4, 2006

(65) Prior Publication Data
US 2006/0224640 A1   Oct. 5, 2006

(30) Foreign Application Priority Data
Apr. 4, 2005   (TW) ............... 94110784 A

(51) Int. Cl.
*G06F 17/30* (2006.01)
(52) U.S. Cl. .................. 707/203; 707/10; 707/200; 707/204; 709/248
(58) Field of Classification Search .............. 707/10, 707/200, 203, 204; 709/248
See application file for complete search history.

(56) References Cited

U.S. PATENT DOCUMENTS

| | | | | |
|---|---|---|---|---|
| 5,974,238 | A * | 10/1999 | Chase, Jr. | 709/248 |
| 6,721,787 | B1 * | 4/2004 | Hiscock | 709/217 |
| 2002/0122080 | A1 * | 9/2002 | Kunii et al. | 345/864 |
| 2002/0142797 | A1 * | 10/2002 | Tarighi et al. | 455/556 |
| 2005/0228812 | A1 * | 10/2005 | Hansmann et al. | 707/102 |
| 2007/0190978 | A1 * | 8/2007 | White et al. | 455/412.1 |

* cited by examiner

*Primary Examiner*—Cam-Linh Nguyen

(57) ABSTRACT

A communication method between an electronic apparatus and synchronization software includes performing data description communication between the electronic apparatus and the synchronization software to negotiate an acceptable data format; and performing data operation communication between the electronic apparatus and the synchronization software to complete a data processing operation according to the data format.

29 Claims, 2 Drawing Sheets

COMMUNICATION METHOD BETWEEN AN ELECTRONIC APPARATUS AND SYNCHRONIZATION SOFTWARE

This application claims the benefit of Taiwan application Ser. No. 94110784, filed Apr. 4, 2005, the subject matter of which is incorporated herein by reference.

BACKGROUND OF THE INVENTION

1. Field of the Invention

The invention relates in general to a communication method between an electronic apparatus and synchronization software, and more particularly to a communication method between an electronic apparatus and synchronization software, in which a data format can be determined by negotiation before a data processing operation.

2. Description of the Related Art

In general design, a mobile phone is incorporated with synchronization software used in a personal computer or a personal digital assistant (PDA) for retrieving and displaying data in the mobile phone, for example, reading data in a phonebook of the mobile phone and saving them in the personal computer, or transferring the data inputted to the personal computer by a user to those of mobile-phone data format and writing them into the mobile phone.

However, the synchronization software has usually problems of compatibility and extension in process of design and development, thereby giving many troubles to the mobile phone users and R&D technologists. In terms of compatibility, software structure set in each type of mobile phone has a great variety. Take the phonebook of a mobile phone as an example, an old type of mobile phone may have only a field of names and a field of telephone numbers whose available data recording amount is respectively 20 words and 10 words. However, the phonebook in a new type of mobile phone may have four fields such as names, telephone numbers, rings, and pictures, and available data recording amount in the name and telephone number fields is respectively 40 words and 20 words. As a result, two different processing methods have to be used to read records in the two completely different phonebooks. That is, when a data processing operation is performed between a new-type mobile phone and old-type synchronization software, a serious data-overflow issue may occur or the old-type synchronization software cannot understand what data mean in the new-type mobile phone.

In order to solve the above-mentioned issue, the new-type synchronization software is generally designed to support both the new-type and old-type mobile phones. However, if the old-type synchronization software is to be incorporated with a new-type mobile phone, all compatibility-relevant operations should be considered in development of mobile-phone internal software, thereby increasing design complication. Users may have to re-install a new type of synchronization software only because of slight modification in the mobile phone. If the users use an improper type of synchronization software to perform a data operation with their mobile phones, operation errors will be produced to increase repair complication.

SUMMARY OF THE INVENTION

It is therefore an object of the invention to provide a communication method between an electronic apparatus and synchronization software. The compatibility and extension between the electronic apparatus and synchronization software can be improved by negotiating the data format in transmission and application interfaces between the electronic apparatus and synchronization software beforehand.

The invention achieves the above-identified object by providing a communication method between an electronic apparatus and synchronization software. The communication method includes performing data description communication between the electronic apparatus and the synchronization software to negotiate an acceptable data format; and performing data operation communication between the electronic apparatus and the synchronization software to complete a data processing operation according to the data format.

The invention achieves the above-identified object by providing a communication method between an electronic apparatus and synchronization software. The communication method includes sending out a description request data packet by the synchronization software to the electronic apparatus, wherein the description request data packet has a data description request format comprising a module type and a packet type; responding a description response data packet having a data description response format by the electronic apparatus to the synchronization software according to the module type and the packet type, wherein the data description response format comprises a transmission description response corresponding to the packet type and a plurality of field description responses corresponding to a plurality of fields in the packet type; sending out an operation request data packet by the synchronization software to the electronic apparatus to perform a data operation request; and responding an operation response data packet by the electronic apparatus to the synchronization software to perform a data operation response.

Other objects, features, and advantages of the invention will become apparent from the following detailed description of the preferred but non-limiting embodiments. The following description is made with reference to the accompanying drawings.

DETAILED DESCRIPTION OF THE INVENTION

In the following preferred embodiment, a mobile phone is taken as an example for the electronic apparatus. However, the communication method of the invention is not limited thereto, and can be also applied to any other electronic apparatus such as a PDA. The operation modes between the synchronization software and mobile phone can be classified into four types: adding data to the mobile phone, deleting data from the mobile phone, editing data in the mobile phone and reading data from the mobile phone. Data modules to be processed in the mobile phone can be a phonebook, rings, and ID photos. As long as the synchronization software obtains the format of to-be-processed data in the mobile phone, the synchronization software can perform a normal data operation with the mobile phone. Therefore, a communication method in which the mobile phone informs the synchronization software about the data format, data expression way, and data limitation is provided to prevent the above-mentioned incompatibility issue in the preferred embodiment of the invention.

Figure 1:
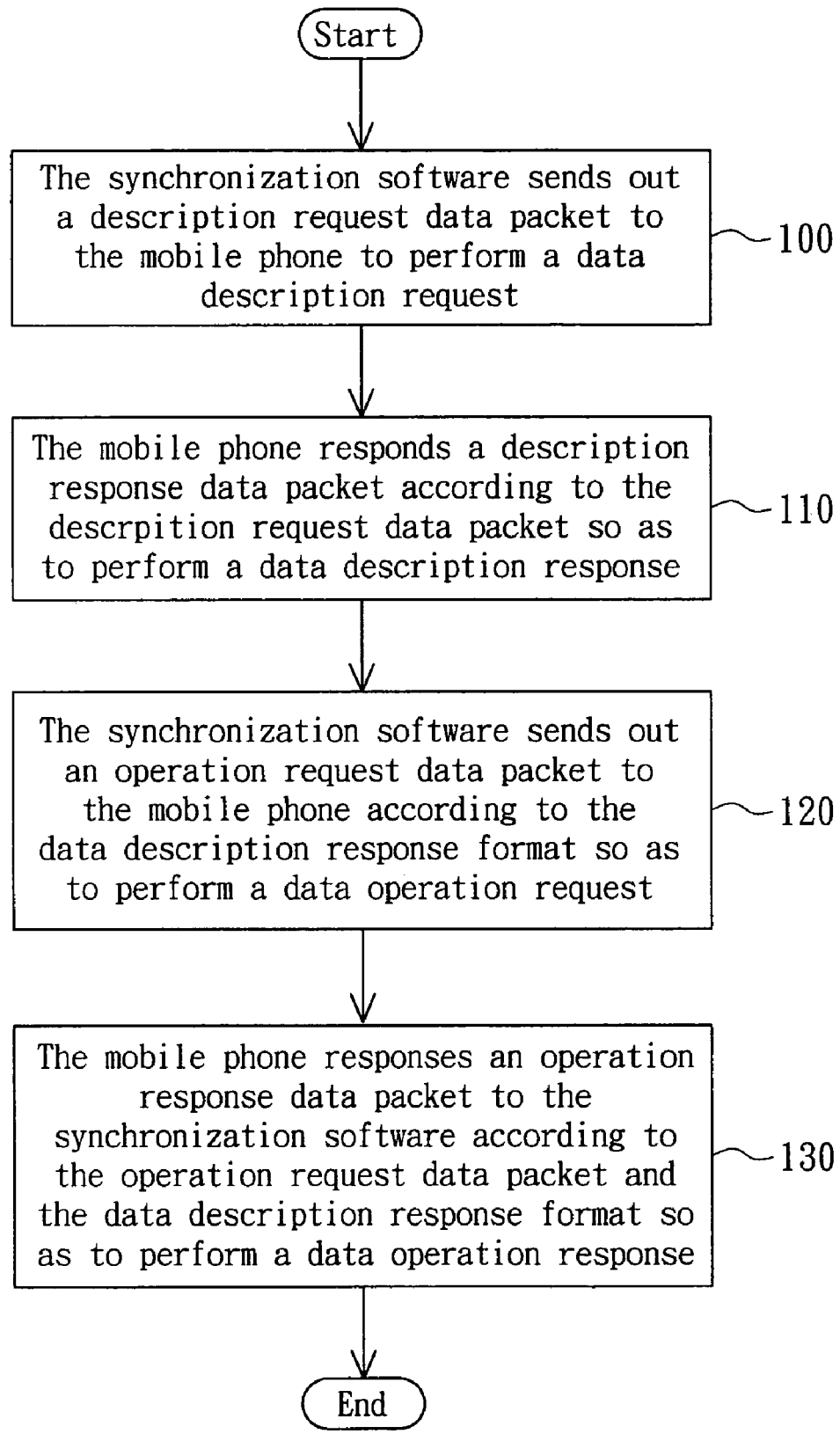
FIG. 1 is a flowchart of a communication method between a mobile phone and synchronization software according to a preferred embodiment of the invention.

Referring to FIG. 1, a flowchart of a communication method between a mobile phone and synchronization software according to a preferred embodiment of the invention is shown. First, the mobile phone performs data description communication with the synchronization software to negotiate an acceptable data format. In step 100, the synchronization software sends out a description request data packet to the mobile phone to perform a data description request (DDReq). The data description request format includes a module type code (Mod ID) and a packet type code (Pkt ID) and is represented by

| Mod ID | Pkt ID |

The synchronization software informs the mobile phone about the packet type of the data it processes and the software module they belong to. For example, if the synchronization software sends out a DDReq having a format

| φxφ1 | φxφ2 | to request for the data type of a phonebook record and sends a DDReq having a format

| φxφ1 | φxφ3 | to request for the data type of a caller group.

Next, in step 110, the mobile phone returns a description response data packet to perform a data description response (DDRsp) according to the description request data packet. When the mobile phone receives the DDReq, the mobile phone responses the DDRsp according to the Mod ID and Pkt ID. The DDRsp includes a transmission descriptor TD corresponding to the Pkt ID and field descriptors corresponding to a number of fields in the packet type of the Pkt ID. The transmission descriptor is for informing the synchronization software about the way of data transmission. The format of the transmission descriptor includes a transmission mode, a data transmission amount, and a field number, and is represented by

| Tx Mode | Tx Size | Field Cnt |

For example, the phonebook record of the mobile phone has two fields, Name and Phone-number, whose available data recording amount is respectively 10 words and 8 words. The transmission descriptor TD is represented by

| φxφφ | φx12 | φxφ2 | to represent a transmission non-string mode, an 18-bit maximum data transmission amount, and two fields.

Furthermore, each field has a field descriptor. The format of the field descriptor includes an object type, a data type, a data size and a field label, and is represented by

| Obj-type | Data-type | Size | Label |

The data type includes a string, figures 0 to 9, symbols *, #, and letters A to Z. Take the phonebook record as an example. The field descriptor FD1 is represented by

| φxφ1 | φxφ1 | φxφA | "NAME" | to represent a character element, an Ascii string, a 10-word maximum data amount and a field, Name. The field descriptor FD2 is represented by

| φxφ1 | φxφ2 | φxφ8 | "Pbnum" | to represent a character element, figures 0 to 9, a 8-word maximum data amount and a field, Phone-number. Therefore, the DDRsp to be responded to the synchronization software has a format

| TD | FD1 | FD2 |

The mobile phone and synchronization software make a communication protocol to determine an acceptable data format via the DDReq and DDRsp, and then perform data operation communication, basically defined as an application interface to complete the required data processing operation, such as adding data to the mobile phone, deleting data from the mobile phone, editing data in the mobile phone and reading data from the mobile phone according to the data format.

Afterward, in step 120, the synchronization software sends out an operation request data packet to the mobile phone to perform a data operation request (DOReq) according to the determined data format, i.e. the format of the data description response DDRsp mentioned above. The application interface for data operation request has a format including an operation code, an operation module type code (Mode ID), an operation packet type code (Pkt ID), and a parameter, represented by

| op code | Mode ID | Pkt ID | parameter |

The operation code represents a kind of data processing operation mentioned above, and the parameter field is filled in according to the data description response DDRsp. Take reading data in a phonebook record as an example. The application interface format

| φxφ1 | φxφ1 | φxφ2 | φxφ2 | represents a reading operation, a phonebook module, a phonebook record and two sets of data.

Finally, in step 130, the mobile phone responses an operation response data packet to the synchronization to perform a data operation response DORsp according to the operation request data packet and the determined data format. When the above-mentioned DOReq is sent to the mobile phone, the corresponding module of the mobile phone is informed that the synchronization software is to read the second set of data in the phonebook record of the phonebook module according to the information recorded in the DOReq. Therefore, a DORsp is packed through an internal operation, filled in data according to the definition format of the DDRsp, and then responded to the synchronization software. When the synchronization software receives the DORsp, the synchronization software can correctly display data, such as names and phone-numbers on a screen of a personal computer, a notebook computer, or a PDA by using a corresponding character element. Moreover, the synchronization software can check if the data inputted by a user are correct according to the data type of each field descriptor FD to prevent the data overflow issue in transmission.

Figure 2:
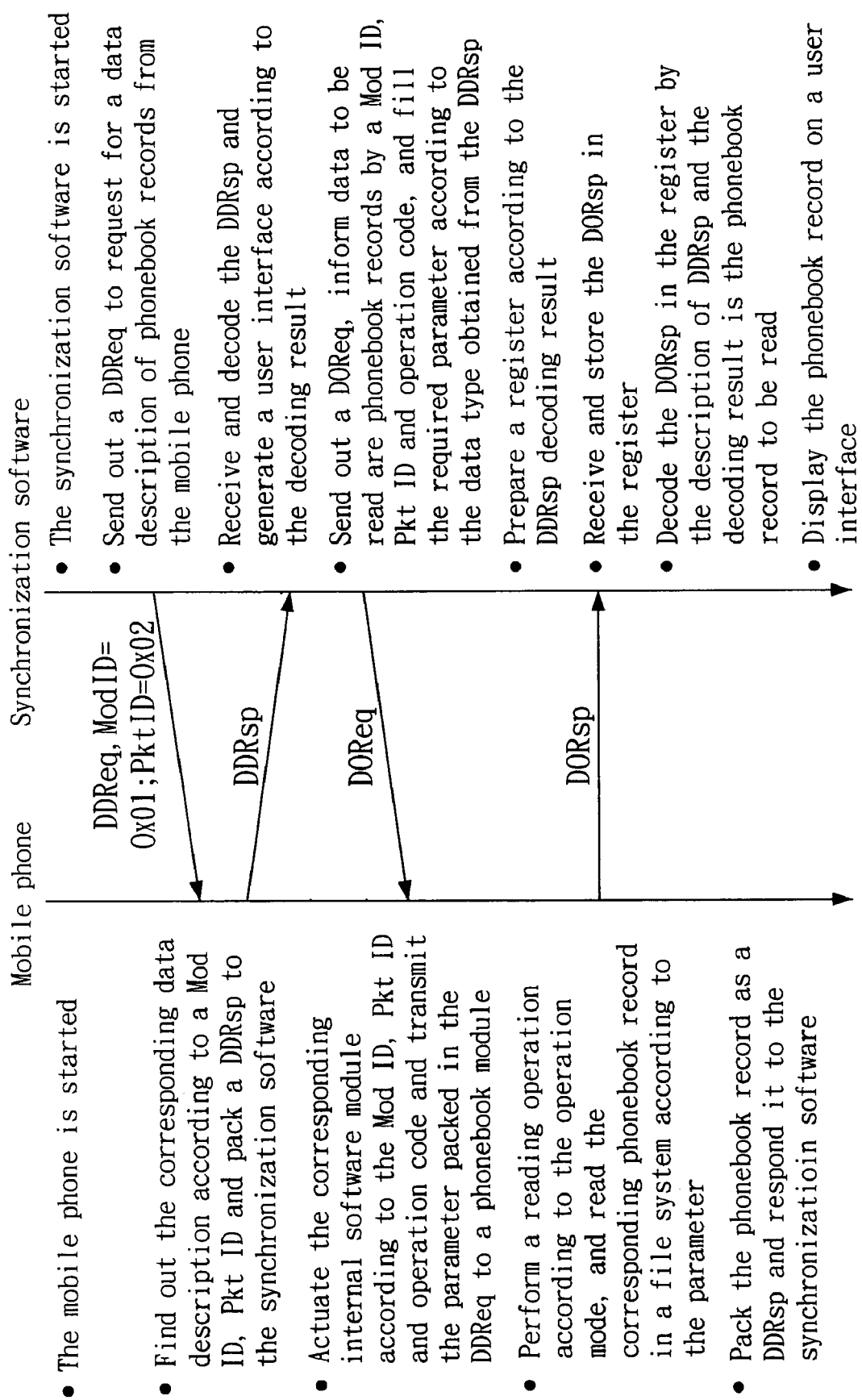
FIG. 2 is a flowchart of using the synchronization software to operate a phonebook of a mobile phone time process to display a record according to the preferred embodiment of the invention

Referring to FIG. 2, a flowchart of using the synchronization software to operate a phonebook of a mobile phone time process to display a record according to the preferred embodiment of the invention is shown. First, the synchronization software sends out a DDReq to request a data description about the phonebook from the mobile phone. Next, the mobile phone finds out the corresponding data description according to the Mod ID and Pkt ID, and responses a DDRsp to the synchronization software. Then, the synchronization receives and decodes the DDRsp, generates a user interface and a register according to the decoding result, and sends out a DOReq to the mobile phone. Afterward, the mobile phone actuates the corresponding internal software module according to the Mod ID, Pkt ID and operation code of the DOR eq, and transmits the parameter packed in the DOReq to the phonebook module. The phonebook module performs a reading operation according to the operation code, reads the corresponding phonebook record in a file system according to the parameter provided, packs the phonebook record in a DORsp, and responds the DORsp to the synchronization software. The synchronization software receives and stores the DORsp in the register, and decodes the DORsp in the register according to description of the DDRsp, wherein the decoding result is the phonebook record to be read. Last, the synchronization software displays the phonebook record on a user interface.

According to the above-mentioned preferred embodiment, the communication method between an electronic apparatus and synchronization software of the invention has the following advantages:

1. By using the above-mentioned data description protocol, it is not necessary to modify operation of the synchronization software along with any pattern change or data type correction of the electronic apparatus.

2. The communication method of the invention has high compatibility. Due to interface unity, the synchronization software can effectively display the data of different electronic apparatuses according the data format and support extent claimed by the electronic apparatuses and the issue that the client has to replace the synchronization software for different electronic apparatuses can be prevented.

3. By using the communication method of the invention, the user can transfers the data of an old-type electronic apparatus quickly to a new-type electronic apparatus due to the compatibility of the synchronization software, thereby increasing the convenience of mobile phone replacement.

4. Because the data packets respectively transmitted by the synchronization software and the electronic apparatus are independent to each other, errors generated by the electronic apparatus will not be transferred to the synchronization software, and thus errors found in a research and development process can be easily determined to be resulted from the electronic apparatus or the synchronization software, thereby increasing efficiency of system development.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication method between an electronic apparatus and synchronization software, comprising:
    performing data description communication between the electronic apparatus and the synchronization software to negotiate an acceptable data format, comprising:
    sending out a description request data packet to the electronic apparatus by the synchronization software to request for describing data of a packet type of a software module in the electronic apparatus; and
    responding a description response data packet to the synchronization software by the electronic apparatus according to the description request data packet to describe the data of the packet type of the software module, wherein the description response data packet comprises a transmission descriptor corresponding to the packet type and a plurality of field descriptors corresponding to a plurality of fields in the packet type; and performing data operation communication between the electronic apparatus and the synchronization software to complete a data processing operation according to the data format.

2. The communication method according to claim 1, wherein the transmission descriptor comprises a transmission mode, a transmission data amount, and a field number, and each field descriptor comprises an element type, a data type, a data size and a field topic.

3. The communication method according to claim 1, wherein performing data operation communication between the electronic apparatus and the synchronization software according to the data format comprises sending out an operation request data packet to the electronic apparatus by the synchronization software according to the data format so as to perform a data operation request; and responding an operation response data packet to the synchronization software by the electronic apparatus so as to perform a data operation response.

4. The communication method according to claim 3, wherein the data operation request has a format of an application interface including an operation code, an operation module type, an operation packet type, and a parameter, and the parameter is generated according to the data description response.

5. The communication method according to claim 3, wherein the synchronization software decodes the data operation response to complete the data processing operation according to the data description response.

6. The communication method according to claim 3, wherein the electronic apparatus is a mobile phone and the synchronization software sends out the description request data packet to request a data description about a phonebook module from the mobile phone.

7. The communication method according to claim 6, wherein the mobile phone finds out the corresponding data description according to a module type code and a packet type code of the description request data packet and responses the description response data packet to the synchronization software.

8. The communication method according to claim 7, wherein the synchronization software receives and decodes the description response data packet, generates a user interface and a register according to a decoding result, and sends out the operation request data packet to the mobile phone.

9. The communication method according to claim 8, wherein the mobile phone actuates corresponding internal software module according to the module type code, the packet type code and an operation code of the operation request data packet, and transmits a parameter packed in the operation request data packet to the phonebook module.

10. The communication method according to claim 9, wherein the phonebook module performs a reading operation according to the operation code, reads corresponding phonebook record in a file system according to the parameter provided, packs the phonebook record in the operation response data packet and responds the operation response data packet to the synchronization software.

11. The communication method according to claim 10, wherein the synchronization software receives and stores the operation response data packet in the register, and decodes the operation response data packet in the register according to description of the description response data packet.

12. The communication method according to claim 11, wherein the decoding result is a phonebook record to be read, and the synchronization software displays the phonebook record on a user interface.

13. The communication method according to claim 1, wherein the data format is a format of the data description response.

14. The communication method according to claim 1, wherein the synchronization software is used in a computer, and the synchronization software checks if the data inputted to the electronic apparatus from the computer are correct according to the data description response.

15. A communication method between an electronic apparatus and synchronization software, comprising:
  sending out a description request data packet to the electronic apparatus by the synchronization software to request for describing data of a packet type of a software module in the electronic apparatus, wherein the description request data packet has a data description request format com prism g a module type code corresponding to the software module and a packet type code corresponding to the packet type;
  responding a description response data packet having a data description response format to the synchronization software by the electronic apparatus according to the module type code and the packet type code to describe the data of the packet type of the software module, wherein the data description response format comprises a transmission description response corresponding to the packet type and a plurality of field description responses corresponding to a plurality of fields in the packet type;
  sending out an operation request data packet to the electronic apparatus by the synchronization software so as to perform a data operation request; and
  responding an operation response data packet to the synchronization software by the electronic apparatus so as to perform a data operation response.

16. The communication method according to claim 15, wherein the electronic apparatus is a mobile phone, the module type comprises a phonebook, a ring, and an ID photo, and the packet type comprises a phonebook record and a caller group.

17. The communication method according to claim 15, wherein the transmission description response comprises a transmission mode, a transmission data amount and a field number, and each of the field description response comprises an element type, a data type, a data size, and a field topic.

18. The communication method according to claim 17, wherein the electronic apparatus informs the synchronization software about the data transmission way of the electronic apparatus via the transmission description response, and the transmission data amount is a permitted maximum data transmission amount of the electronic apparatus.

19. The communication method according to claim 17, wherein the transmission mode comprises a non-string mode, the element type comprises a character element, and the data type comprises strings, FIG. 0 to 9, symbols * ,#, and letters A to Z.

20. The communication method according to claim 15, wherein the data operation request has a format of an application interface including an operation code, an operation module type, an operation packet type and a parameter, and the parameter is generated according to the data description response format.

21. The communication method according to claim 15, wherein the synchronization software decodes content of the data operation response to complete a data processing operation according to data description response.

22. The communication method according to claim 15, wherein the synchronization software is used in a computer, and the synchronization software checks if the data inputted to the electronic apparatus from the computer are correct according to the data description response.

23. The communication method according to claim 15, wherein the electronic apparatus is a mobile phone and the synchronization software sends out the description request data packet to request a data description about a phonebook module from the mobile phone.

24. The communication method according to claim 23, wherein the mobile phone finds out the corresponding data description according to a module type code and a packet type code of the description request data packet and responses the description response data packet to the synchronization software.

25. The communication method according to claim 24, wherein the synchronization software receives and decodes the description response data packet, generates a user interface and a register according to a decoding result, and sends out the operation request data packet to the mobile phone.

26. The communication method according to claim 25, wherein the mobile phone actuates corresponding internal software module according to the module type code, the packet type code and an operation code of the operation request data packet, and transmits a parameter packed in the operation request data packet to the phonebook module.

27. The communication method according to claim 26, wherein the phonebook module performs a reading operation according to the operation code, reads corresponding phonebook record in a file system according to the parameter provided, packs the phonebook record in the operation response data packet and responds the operation response data packet to the synchronization software.

28. The communication method according to claim 27, wherein the synchronization software receives and stores the operation response data packet in the register, and decodes the operation response data packet in the register according to description of the description response data packet.

29. The communication method according to claim 28, wherein the decoding result is a phonebook record to be read, and the synchronization software displays the phonebook record on a user interface.

\* \* \* \* \*